United States Patent
Hiroki (10) Patent No.: US 9,434,299 B2
(45) Date of Patent: Sep. 6, 2016

(54) CANCEL CAM STRUCTURE AND ROTATABLE CONNECTOR DEVICE

(71) Applicants: FURUKAWA ELECTRIC CO., LTD., Tokyo (JP); FURUKAWA AUTOMOTIVE SYSTEMS INC., Shiga (JP)

(72) Inventor: Kenji Hiroki, Shiga (JP)

(73) Assignees: Furukawa Electric Co., Ltd., Tokyo (JP); Furukawa Automotive Systems Inc., Shiga (JP)

(*) Notice: Subject to any disclaimer, the term of this patent is extended or adjusted under 35 U.S.C. 154(b) by 435 days.

(21) Appl. No.: 13/898,194

(22) Filed: May 20, 2013

(65) Prior Publication Data

US 2013/0292234 A1 Nov. 7, 2013

Related U.S. Application Data

(63) Continuation of application No. PCT/JP2011/076696, filed on Nov. 18, 2011.

(30) Foreign Application Priority Data

Nov. 18, 2010 (JP) ................. 2010-257971

(51) Int. Cl.
*H01H 3/16* (2006.01)
*B60Q 1/42* (2006.01)

(52) U.S. Cl.
CPC ................ *B60Q 1/425* (2013.01)

(58) Field of Classification Search
CPC ................................... B60Q 1/425
USPC ................... 200/61.3–61.38, 61.54
See application file for complete search history.

(56) References Cited

U.S. PATENT DOCUMENTS 4,739,131 A * 4/1988 Maeda .............. 200/61.27
6,472,623 B1 * 10/2002 Hayashi ............ 200/61.27
6,660,951 B2 * 12/2003 Uchiyama .......... 200/61.3

FOREIGN PATENT DOCUMENTS

| EP | 0505114 A2 | 9/1992 |
| EP | 0965492 A2 | 12/1999 |
| JP | 63-159344 U | 10/1988 |
| JP | 2010-143460 A | 7/2010 |

OTHER PUBLICATIONS

International Search Report issued in Application No. PCT/JP2011/076696, dated Feb. 14, 2012 (1 page).
Extended European Search Report issued in corresponding European Application No. 11841724.5, mailed Jan. 26, 2015 (7 pages).

* cited by examiner

*Primary Examiner* — Renee Luebke
*Assistant Examiner* — Lheiren Mae A Caroc
(74) *Attorney, Agent, or Firm* — Osha Liang LLP (57) ABSTRACT

A cam section includes a projection section projecting toward an enclosed space enclosed by an outer circumferential cam wall, an inner wall located radially inner to the outer circumferential cam wall, and a coupling cam wall for coupling ends of the outer circumferential cam wall and the inner wall.

8 Claims, 9 Drawing Sheets

CANCEL CAM STRUCTURE AND ROTATABLE CONNECTOR DEVICE

TECHNICAL FIELD

The present invention relates to a cancel cam structure for pivoting and thus returning a turn lever, for indicating a direction in which an automobile is to be turned, from a left turn indication pivoting position or a right turn indication pivoting position to a neutral position by pivoting of a steering wheel, and a rotatable connector device.

BACKGROUND ART

For a right turn, a left turn or a lane change, a driver of an automobile pivots a turn lever counterclockwise (left turn indication pivoting direction) or clockwise (right turn indication pivoting direction) to indicate a turning direction of the automobile and pivots a steering wheel from a neutral position to a turning direction.

Then, when the automobile finishes turning right, turning right, or changing the lane, the driver pivots the steering wheel in the opposite direction to the above-mentioned pivoting operation to return the steering wheel to the neutral position. Recently, automobiles are structured to automatically return the turn lever to the neutral position along with the driver's pivoting operation of returning the steering wheel to the neutral position.

Figure 7:
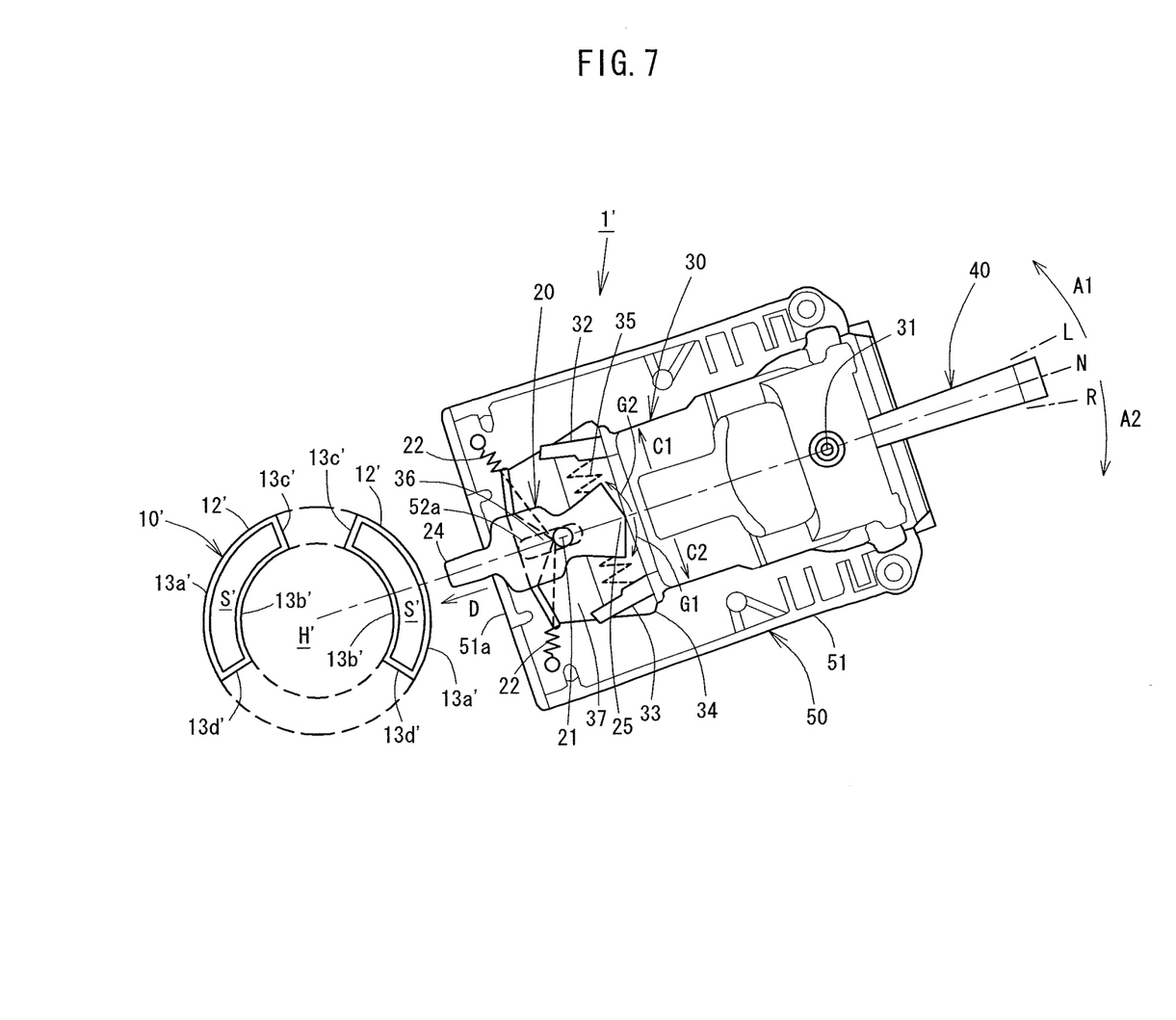
FIG. 7 shows a neutral state of a cancel cam structure in a conventional example.
Figure 8:
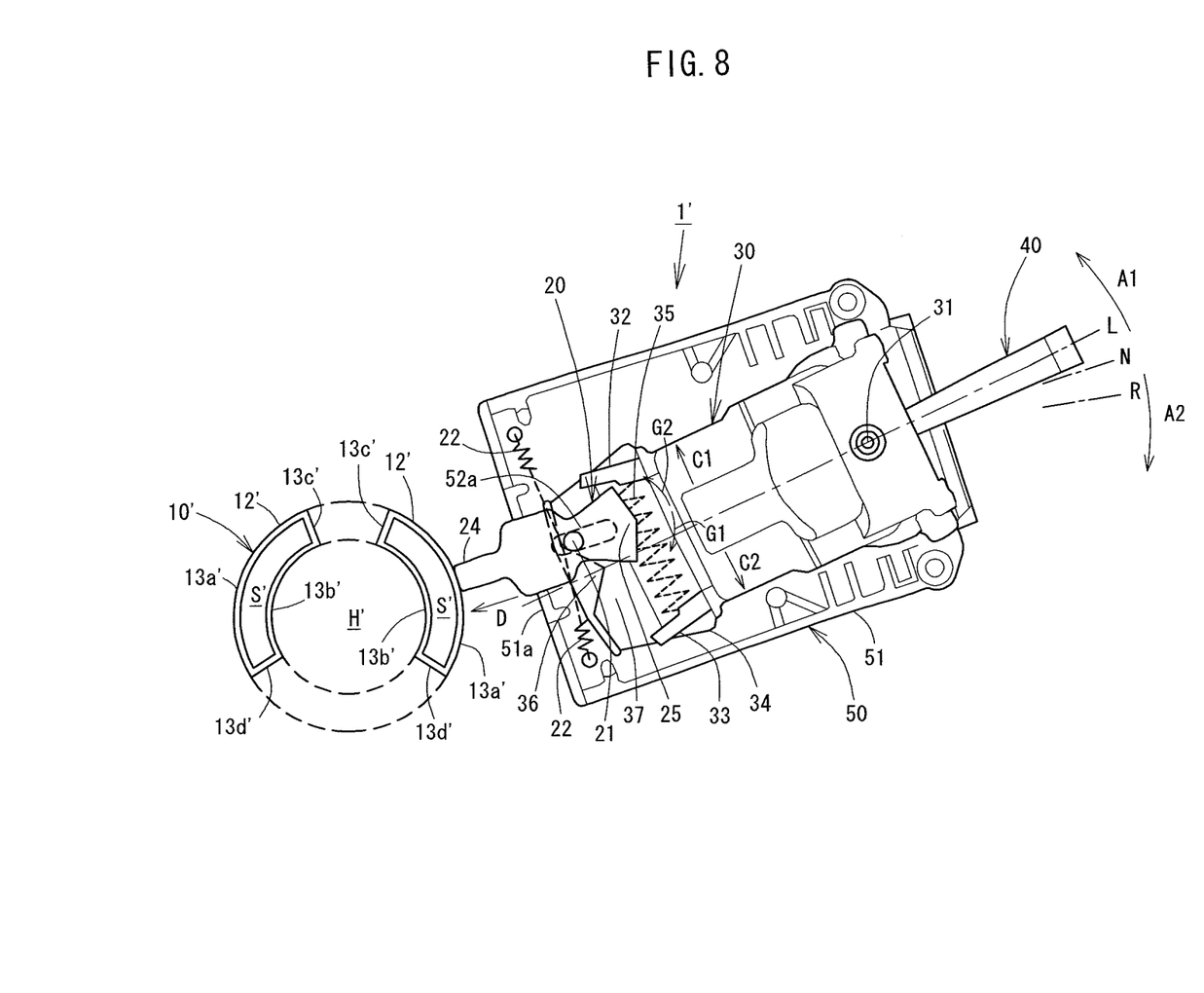
FIG. 8 shows a left turn indication state of the cancel cam structure in the conventional example.

This is realized by, for example, as shown in FIG. 7 and FIG. 8 (or Patent Document 1), a cancel mechanism 1' including a turn lever 40 described above, a cancel cam structure 10', a bracket 30, and a ratchet 20.

The cancel cam structure 10' is pivoted like a steering wheel (not shown) by an operation of pivoting the steering wheel. The bracket 30 is located between the turn lever 40 and the cancel cam structure 10', and is pivotable by the pivoting of the cancel cam structure 10' and the turn lever 40. The ratchet 20 transmits a pivoting force of the cancel cam structure 10', generated when the steering wheel is pivoted and returned to a neutral position N, to the bracket 30 and thus pivots and returns the bracket 30 and the turn lever 40 to the neutral position N.

This will be described in more detail. In a state where the turn lever 40 and the bracket 30 are at the neutral position N as shown in FIG. 7, the ratchet 20 is urged toward the cancel cam structure 10' by a ratchet spring 22 forming urging means.

In this state, a non-cancel cam-side end 25 of the ratchet 20, which is on the opposite side to the cancel cam structure 10', is located between two engaging sections 32 and 33 provided on the bracket 30 for cancelling. The bracket 30 is held at the neutral position N by moderation means (not shown).

From this state, the driver pivots the turn lever 40 as shown in FIG. 8. When the turn lever 40 and the bracket 30 are pivoted to, for example, a left turn indication position L, an urging force of the ratchet spring 22 puts a cancel cam-side end 24 of the ratchet 20 into contact with a cam section 12' in the cancel cam structure 10'.

At this point, the non-cancel cam-side end 25 of the ratchet 20 approaches the engaging section 32 among the two engaging sections 32 and 33. Along with the pivoting of the bracket 30, a turn signal switch is actuated to blink a turn signal lamp for left turn.

When, in this left turn indication state, the driver pivots the steering wheel leftward (forward direction), which is the same as the direction indicated by the turn lever 40, to pivot the cancel cam structure 10' leftward, the cam section 12' of the cancel cam structure 10' contacts the cancel cam-side end 24 of the ratchet 20 from one side to swing the ratchet 20 with a ratchet shaft 21 being the swinging center.

In this case, the ratchet 20 is pivoted in a direction away from the engaging section 32 approached by the non-cancel cam-side end 25. Therefore, the bracket 30 and the turn lever 40 are kept at the left turn indication position L. During such forward-direction pivoting, the turn signal switch is kept actuated and thus the turn signal lamp for left turn is kept blinking.

By contrast, when, in the above-described left turn indication state, the driver pivots the steering wheel rightward, which is opposite to the direction indicated by the turn lever 40, to pivot the cancel cam structure 10' rightward, the cam section 12' of the cancel cam structure 10' contacts the cancel cam-side end 24 of the ratchet 20 from the opposite side to the above to pivot the ratchet 20 in the opposite direction to the above.

In this case, the ratchet 20 is pivoted in a direction toward the engaging section 32 approached by the non-cancel cam-side end 25. Therefore, the bracket 30, and thus the turn lever 40, are pivoted from the left turn indication position L toward the neutral position N and thus return to the neutral position N. Along with this, the turn signal switch (not shown) is turned off and the turn signal lamp for left turn (not shown) is put out.

The above description is regarding the case where the bracket 30 is pivoted to the left turn indication position L. In the case where the bracket 30 is pivoted to a right turn indication position R, the basic operation is substantially the same except that the pivoting direction of each member is opposite.

Figure 9:
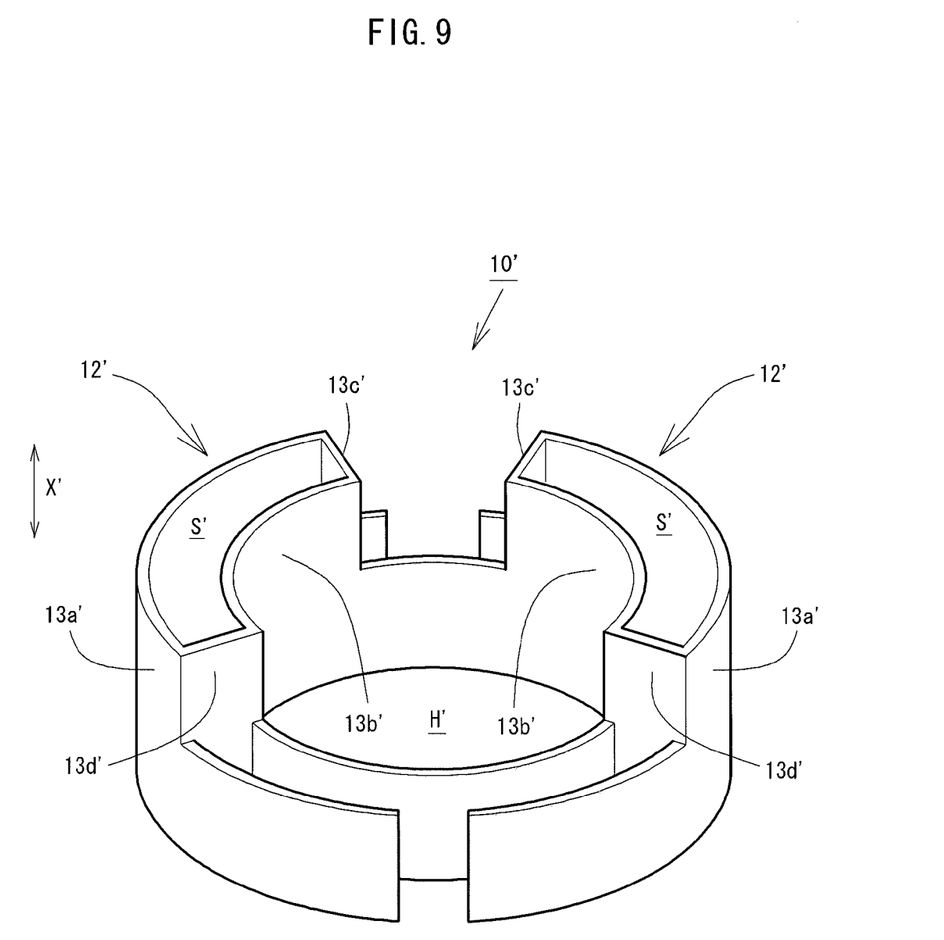
FIG. 9 is an isometric view of the cancel cam structure in the conventional example.

The cam section 12' of the conventional cancel cam structure 10' is formed of a plastic material. For example, as shown in FIG. 9, the cam section 12' is arc-shaped and is enclosed by an arc-shaped outer circumferential cam wall 13a' contactable with the cancel cam-side end 24 of the ratchet 20, an arc-shaped inner wall 13b' having the same central axis as that of the outer circumferential cam wall 13a' but having a smaller diameter than that of the outer circumferential cam wall 13a', and two coupling cam walls 13c' and 13d' extending in a radial direction. The inside of the cam section 12' is hollow (enclosed space S').

With such a structure of the cam section 12' of the cancel cam structure 10', when the turn lever is pivoted to the left turn indication position L (or right turn indication position R) and thus the cancel cam-side end 24 contacts the cam section 12', there is a problem that noise of contact (hammering noise) of the cam section 12' of the cancel cam structure 10' and the cancel cam-side end 24 of the ratchet 20 is large, which disturbs the driver's ears.

CITATION LIST

Patent Literature

Patent Document 1: Japanese Laid-Open Patent Publication No. 2010-143460

SUMMARY OF INVENTION

Technical Problem

The present invention has an object of providing a cancel cam structure capable of suppressing noise of contact (hammering noise) of the cancel cam structure and a ratchet to be small, and a rotatable connector device.

Solution to Problem

The present invention is directed to a cancel cam structure which includes a cam section for allowing a ratchet to be put into contact therewith, is located radially outer to an axial direction of a steering shaft, and is pivotable along with pivoting of a steering wheel connected to the steering shaft. The cam section includes an outer circumferential cam wall for allowing the ratchet to slide thereon; an inner wall located radially inner to the outer circumferential cam wall; and a coupling cam wall for coupling ends of the outer circumferential cam wall and the inner wall; the outer circumferential cam wall, the inner wall, and the coupling cam wall are formed parallel to the axial direction; and an enclosed space is formed by the outer circumferential cam wall, the inner wall, and the coupling cam wall; and at least one of the outer circumferential cam wall, the inner wall, and the coupling cam wall has a projection section projecting toward the enclosed space.

In the present invention, a wall surface of the inner wall may be any of various shapes of wall surface such as a circumferential surface, a flat surface or the like.

According to the present invention, the noise of contact (hammering noise) of the cancel cam structure and the ratchet can be suppressed to be small.

This will be described in more detail. At least one of the outer circumferential cam wall, the inner wall, and the coupling cam wall has a projection section projecting toward the enclosed space. Owing to this, the rigidity of the cam section is increased, and thus the range and amplitude of vibration of the cam section caused by the contact of the ratchet to the cam section can be reduced. Therefore, the noise of contact (hammering noise) of the cancel cam structure and the ratchet can be suppressed to be small, which improves the comfort of the driver.

In the case where, for example, the outer circumferential cam wall has a projection section projecting toward the enclosed space, the mass of the outer circumferential cam wall is increased, and the vibration of the outer circumferential cam wall is made slow by inertia. Therefore, the noise of contact of the cancel cam structure and the ratchet can be made low.

In an embodiment according to the present invention, the outer circumferential cam wall may have an arc shape such that any cross-section thereof perpendicular to the axial direction is centered around an intersection of a central axis of the steering shaft and the cross-section, the arc shape having a certain diameter, and the outer circumferential cam wall may extend uniformly in the axial direction; the inner wall may have an arc shape such that any cross-section thereof perpendicular to the axial direction is centered around an intersection of the central axis and the cross-section, the arc shape having a certain diameter smaller than the diameter of the outer circumferential cum wall, and the inner wall may extend uniformly in the axial direction; and the projection section may be formed of a flat plate-like partition wall standing upright in the axial direction, the partition wall dividing the enclosed space.

According to the present invention, the noise of contact (hammering noise) of the cancel cam structure and the ratchet can be suppressed to be small.

This will be described in more detail. The projection section is located so as to stand upright in the axial direction, and is formed of a flat plate-like partition wall for dividing the enclosed space. Owing to this, as compared with the case where the projection section is not a partition wall, in more detail, as compared with the case where the projection section projects into the enclosed space but does not completely divide the enclosed space, the rigidity of the cam section can be increased. Therefore, the range and amplitude of vibration of the cam section caused by the contact of the ratchet to the cam section can be reduced. Thus, the noise of contact (hammering noise) of the cancel cam structure and the ratchet can be suppressed to be smaller.

According to the present invention, the cam section has a shape uniform with respect to the central axis. Therefore, the cam section providing the above-described effect can be formed easily by plastic molding.

In an embodiment according to the present invention, the partition wall may extend straight in a radial direction.

According to the present invention, the rigidity of the cam section is increased in the radial direction. Therefore, the vibration of the cam section can be suppressed to be significantly small when the ratchet approaches the outer circumferential cam wall of the cam section in a direction from a radially outer side toward a radially inner side and contacts the outer circumferential cam wall. Thus, the contact noise (hammering noise) generated when the ratchet moves toward the central axis of the cam section and contacts the cam section can be suppressed to be significantly small.

According to the present invention, the cam section is divided by the partition wall. Therefore, the outer circumferential cam wall and the inner wall facing the outer circumferential cam wall are each divided by the partition wall in the circumferential direction. Each divided part of the outer circumferential cam wall and a corresponding divided part of the inner wall have different lengths from each other in the circumferential direction. Therefore, resonance of the inner wall due to vibration of the outer circumferential cam wall does not occur easily. Thus, the contact noise (hammering noise) generated when the ratchet contacts the cam section can be suppressed to be small.

In an embodiment according to the present invention, the projection section may be formed of a plurality of partition walls.

According to the present invention, as compared with the case where the cam section includes one partition wall, the rigidity of the cam section is higher. Thus, the vibration noise of the cancel cam structure generated when the ratchet contacts the cancel cam structure can be suppressed to be smaller. Therefore, the contact noise (hammering noise) can be suppressed to be small.

In an embodiment according to the present invention, the projection section may include a plurality of partition walls at prescribed intervals, and distances between the coupling cam wall and the partition wall adjacent thereto and between the partition walls adjacent thereto may include at least two types of distances.

According to the present invention, the enclosed spaces divided by the partition walls include two or more types of spaces having different shapes. Therefore, the natural frequency of a cancel cam structure can be dispersed into two or more. This can suppress the resonance of the cam section of the cancel cam structure.

The present invention is also directed to a rotatable connector device including a rotatable connector; and the above-described cancel cam structure. The rotatable connector includes a fixed case including a ring-shaped fixed-side ring plate and an outer cylindrical section having a cylindrical shape and extending perpendicularly from an outer circumferential edge of the fixed-side ring plate; and a rotatable case including a ring-shaped rotatable-side ring plate and an inner cylindrical section having a cylindrical shape and extending perpendicularly from an inner circumferential edge of the rotatable-side ring plate toward the fixed case. The fixed case and the rotatable case are fit to each other so as to be rotatable with respect to each other in a clockwise direction and a counterclockwise direction; an accommodation section is formed by the fixed-side ring plate and the outer cylindrical section of the fixed case and the rotatable-side ring plate and the inner cylindrical section of the rotatable case; and in the accommodation section, a flat cable for electrically connecting the fixed case and the rotatable case to each other is accommodated in a wound state.

According to the present invention, the cancel cam structure can suppress the vibration thereof, caused by the contact of the ratchet to the cancel cam structure, to be small. Therefore, the rotatable connector device can suppress the vibration applied on the rotatable connector itself to be small.

Advantageous Effects of the Invention

According to the present invention, a cancel cam structure capable of suppressing noise of contact (hammering noise) of the cancel cam structure and a ratchet to be small, and a rotatable connector device can be provided.

DESCRIPTION OF EMBODIMENTS

Hereinafter, an embodiment of the present invention will be described with reference to the drawings.

Figure 1:
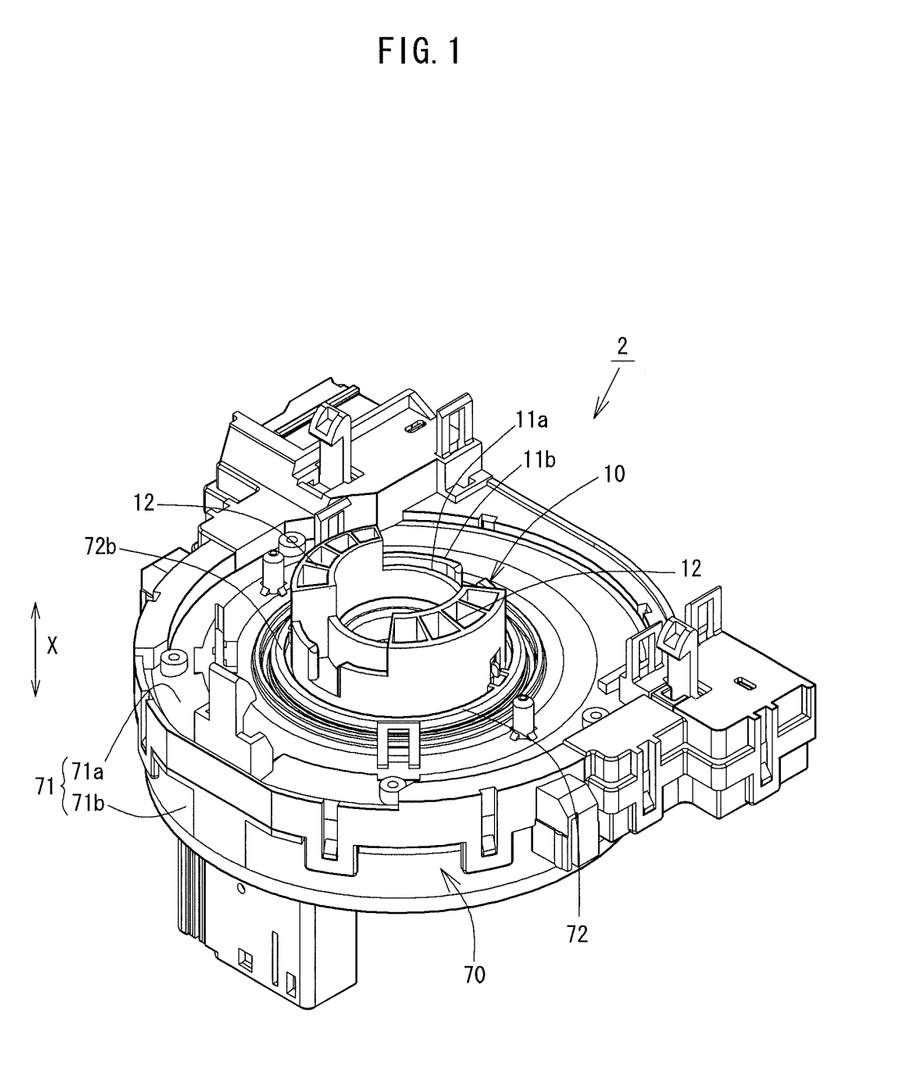
FIG. 1 is an isometric view of a rotatable connector device.
Figure 2:
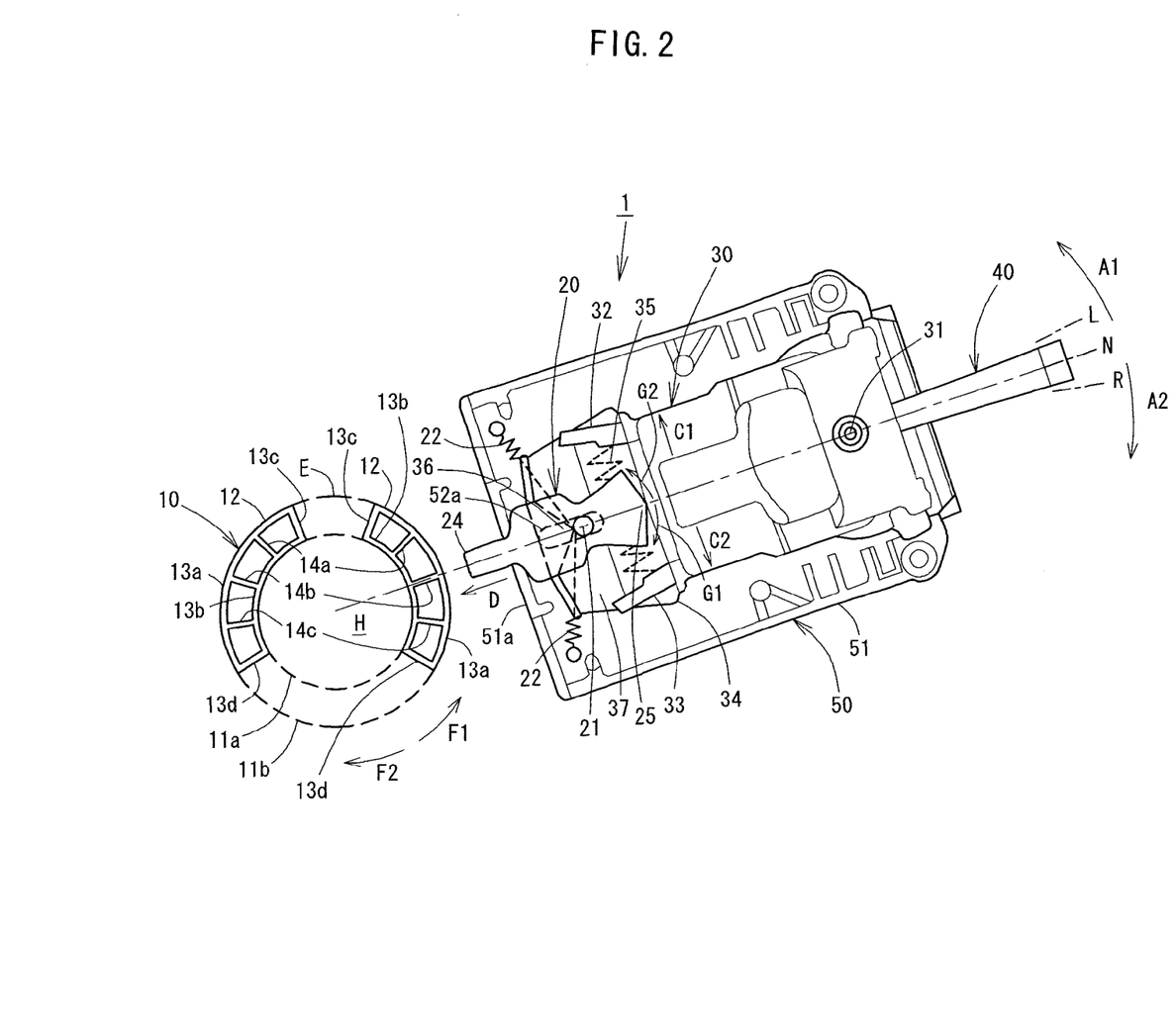
FIG. 2 shows a neutral state of a cancel mechanism.
Figure 3:
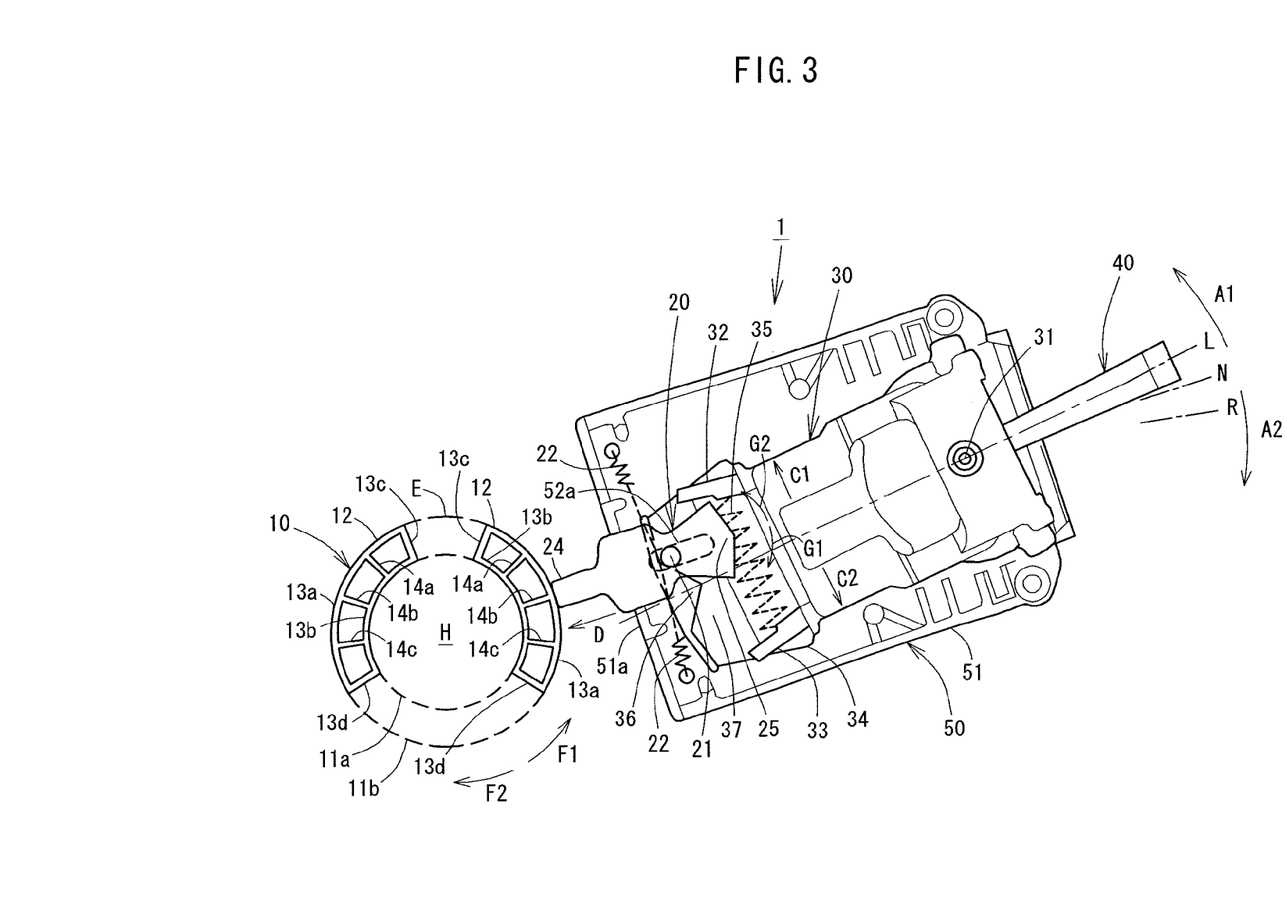
FIG. 3 shows a left turn indication state of the cancel mechanism.

FIG. 1 is an isometric view showing a rotatable connector device 2 including a cancel cam structure 10 in this embodiment. FIG. 2 shows a neutral state of a cancel mechanism 1 as seen from the side of a steering wheel. FIG. 3 shows a left turn indication state of the cancel mechanism 1 also as seen from the side of the steering wheel.

Figure 4:
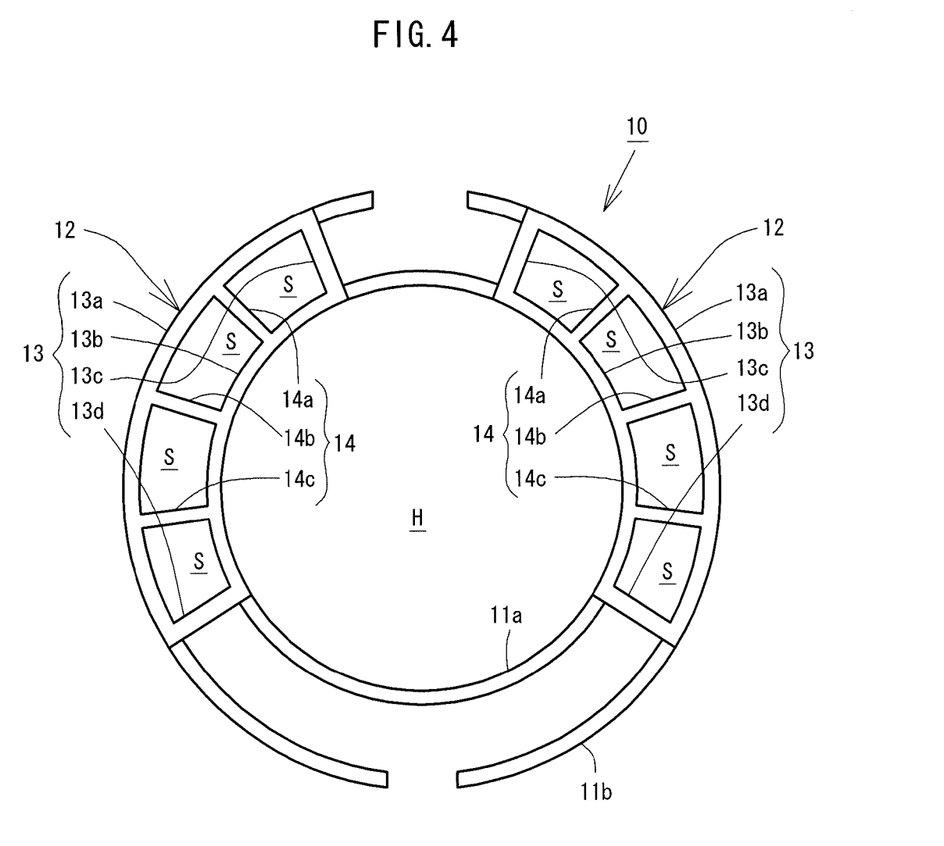
FIG. 4 is a plan view of a cancel cam structure.
Figure 5A:
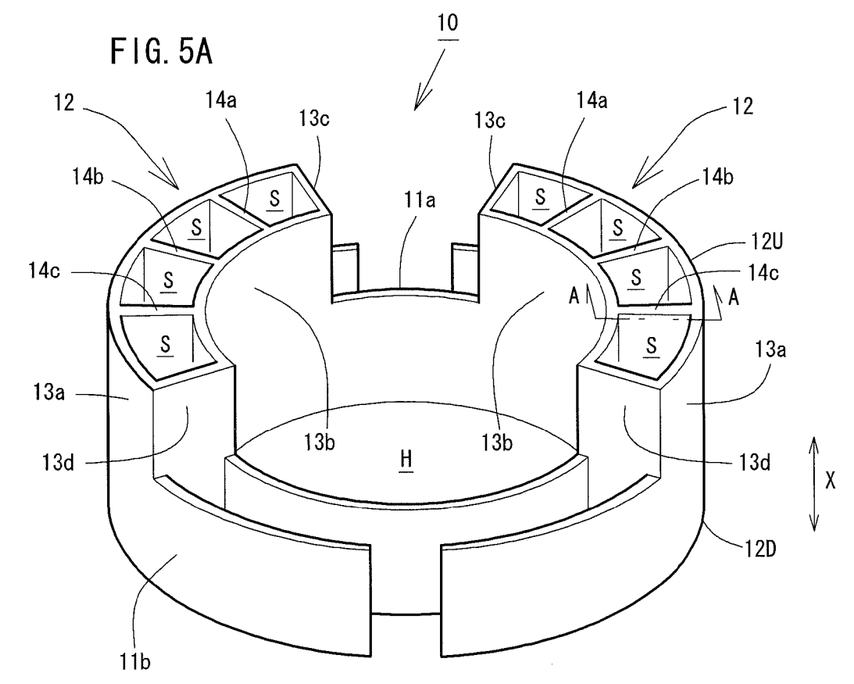
FIGS. 5A and 5B are views showing the cancel cam structure.
Figure 5B:
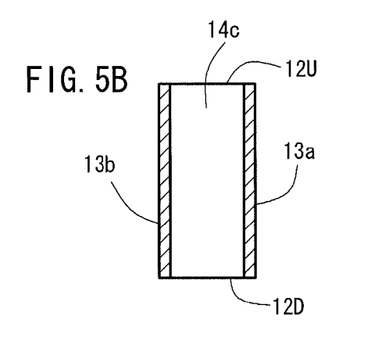

FIG. 4 is a plan view of the cancel cam structure 10 as seen from the side of a combination switch (vehicle body side). FIG. 5A is an isometric view of the cancel cam structure 10 as seen from the side of the combination switch (vehicle body side), and FIG. 5B is a cross-sectional view taken along line A-A in FIG. 5A.

As shown in FIG. 1, the rotatable connector device 2 in this embodiment includes a rotatable connector 70 and the cancel cam structure 10.

Below the rotatable connector device 2 shown in FIG. 1, a steering wheel (not shown) is provided. A top surface of the rotatable connector device 2 shown in FIG. 1 is attached to the combination switch (not shown) on the vehicle body side. In a hollow space H in the rotatable connector device 2, a steering shaft (not shown) is to be inserted.

The rotatable connector 70 mainly includes a fixed case 71, a rotatable case 72, and a flat cable (not shown).

The fixed case 71 includes a ring-shaped fixed-side ring plate 71a and an outer cylindrical section 71b extending downward in FIG. 1 perpendicularly from an outer circumferential edge of the fixed-side ring plate 71a. The fixed case 71 is fixed to the combination switch on the vehicle body side provided on the rotatable connector device 2 shown in FIG. 1.

The rotatable case 72 includes a ring-shaped rotatable-side ring plate (not shown) and an inner cylindrical section 72b having a cylindrical shape and extending upward in FIG. 1 perpendicularly from an inner circumferential edge of the rotatable-side ring plate. The rotatable case 72 is fixed to, and is pivotable with, the steering wheel provided below the rotatable connector device 2 shown in FIG. 1. The rotatable connector device 2 is mounted on the vehicle such that the rotatable case 72 is above the fixed case 11.

An accommodation space for accommodating the flat cable is formed by the fixed-side ring plate 17a and the outer cylindrical section 71b of the fixed case 71 and the rotatable-side ring plate and the inner cylindrical section 72b of the rotatable case 72. The flat cable is accommodated in a wound state in the accommodation space and electrically connect the fixed-side case 71 and the rotatable-side case 72. To the inner cylindrical section 72b of the rotatable case 72, the cancel cam structure 10 is attached. The cancel cam structure 10 is pivotable with the steering wheel.

As shown in FIG. 2 and FIG. 3, the cancel mechanism 1 in this embodiment includes the cancel cam structure 10, a bracket 30, a turn lever 40, and a ratchet 20.

The cancel cam structure 10 in this embodiment is formed of a plastic material, and shown in FIG. 4 and FIG. 5A, has a diameter which allows the steering shaft to be inserted thereto. The cancel cam structure 10 is cylindrical and includes an inner cylinder 11a having a cylindrical shape and extending generally in an axial direction X of the steering shaft, and an outer cylinder 11b having a cylindrical shape. The outer cylinder 11b has the same central axis as that of the inner cylinder 11a and has a diameter larger than that of the inner cylinder 11a. The central axis of the steering shaft matches the central axis of the inner cylinder 11a and the outer cylinder 11b.

The cancel cam structure 10 includes cam sections 12 projecting toward the central axis in a bilaterally symmetrical manner. Each of the cam sections 12 includes a tube-shaped outer wall 13 and partition walls 14 for dividing an enclosed space S enclosed by the outer wall 13.

The outer wall 13 is tube-shaped and includes an outer circumferential cam wall 13a, an inner wall 13b, and coupling cams 13c and 13d.

The outer circumferential cam wall 13a is contactable with a cancel cam-side end 24 of the ratchet 20, and has an arc shape such that any cross-section thereof perpendicular to the axial direction X of the steering shaft is centered around the central axis. The arc shape has a certain diameter, and the outer circumferential cam wall 13a extends uniformly in the axial direction.

Like the outer circumferential cam wall 13a, the inner wall 13b has an arc shape such that any cross-section thereof perpendicular to the axial direction X is centered around the central axis. The arc shape has a certain diameter smaller than the diameter of the outer circumferential cum wall 13a, and the inner wall 13b extends uniformly in the axial direction.

The coupling cam walls 13c and 13d are each formed of a flat plate and stand upright in the axial direction X. The coupling cam walls 13c and 13d each couple ends of the outer circumferential cam wall 13a and the inner wall 13b.

The partition walls 14 include a first partition wall 14a, a second partition wall 14b, and a third partition wall 14c. The partition walls 14 (first partition wall 14a, second partition wall 14b, and third partition wall 14c) are each formed of a flat plate and all have the same thickness. The partition walls 14 are located so as to stand upright in the axial direction X and extend straight in the radial direction of the cancel cam structure 10.

As shown in FIG. 5B, the partition walls 14 are provided from a top end 12U to a bottom end 12D of the cam section 12 in the axial direction X, and connect the outer circumferential cam wall 13a and the inner wall 13b to each other. The partition walls 14 are provided at an equal interval in a circumferential direction of the cancel cam structure 10 so as to equally divide the enclosed space S enclosed by the outer wall 13 into four in the circumferential direction.

Referring to FIG. 2, a body main section 51 of a cancel mechanism-including body 50 having a cancel mechanism 1 built therein is provided to the right of, and in the vicinity of, the cancel cam structure 10. The body main section 51 is fixed to the vehicle body side. The cancel mechanism-including body 50 includes the body main section 51 provided in a lower part thereof and a cover (not shown) attached to a top surface of the body main section 51.

In the body main section 51 of the cancel mechanism-including body 50, the bracket 30, the turn lever 40 and the ratchet 20 are located.

Referring to FIG. 2, the bracket 30 is pivotable in directions of arrows A1 and A2 with a bracket shaft 31 being the pivoting center. On a top surface of the bracket 30, a back plate 34 having the two engaging sections 32 and 33 for cancelling is provided.

Referring to FIG. 2, the back plate 34 is movable in directions of arrows C1 and C2 and is normally kept by a back spring 35 at an equilibrium position of the back spring 35. The two engaging sections 32 and 33 are located so as to expand toward the cancel cam structure 10.

On a tip side of the bracket 30 (on the side of the cancel cam structure 10), a guide convexed section 36 (see FIG. 3) having a mountain shape and projecting toward the combination switch is formed. To both of the sides of the guide convexed section 36, guide concaved sections 37 lower than the guide convexed section 36 are formed.

On the tip side of the top surface of the bracket 30, the ratchet 20 is located. The ratchet 20 is covered with a cover member (not shown). A ratchet shaft 21 projecting upward and downward is provided at a position which is approximately the center of the ratchet 20 in a longitudinal direction thereof. The ratchet shaft 21 is provided integrally with the ratchet 20. The ratchet 20 is swingable with the ratchet shaft 21 being the swinging center.

A bottom part of the ratchet shaft 21 is inserted into the tip side of the bracket 30. A top part of the ratchet shaft 21 is movably inserted into a guide groove 52a formed in an inner surface of the cover member. The guide groove 52a extends in a direction connecting the center of the bracket shaft 31, which is the pivoting center of the bracket 30, and a pivoting center of the cancel cam structure 10.

Below the ratchet 20, a concaved section for spring is formed. An intermediate part of the ratchet spring 22 formed of a tension coil spring is inserted into the concaved section for spring. Both of two ends of the ratchet spring 22 in a longitudinal direction thereof are hooked on the body main section 51. The ratchet 20 is urged toward the cancel cam structure 10 (direction of arrow D in FIG. 2) by an urging force of the ratchet spring 22.

The ratchet 20 is swingable about the ratchet shaft 21 and also is movable along the guide groove 52a toward and away from the cancel cam structure 10. The cancel cam-side end 24 of the ratchet 20, which is on the side of the cancel cam structure 10, projects from an opening 51a of the body main section 51 toward the cancel cam structure 10. A non-cancel cam-side end 25 of the ratchet 20, which is on the opposite side to the cancel cam structure 10, is located between the two engaging sections 32 and 33.

In the state where the turn lever 40 and the bracket 30 are at the neutral position N shown in FIG. 2, the bottom part of the ratchet shaft 21 of the ratchet 20 is at a position facing a tip of the guide convexed section 36 on the tip side of the bracket 30. The ratchet 20 is displaced in a direction away from the cancel cam structure 10 (opposite to the direction of arrow D) against the urging force of the ratchet spring 22.

In this neutral state, the cancel cam-side end 24 is outside a pivoting track E (see FIG. 2) of the cam section 12 of the cancel cam structure 10. The non-cancel cam-side end 25 of the ratchet 20 is located at a position which is approximately the center between the two engaging sections 32 and 33.

When the turn lever 40 is pivoted in, for example, the direction of arrow A1, which is the left turn indication direction, from this neutral state, the bracket 30 is pivoted in the direction of arrow A1 about the bracket shaft 31 together with the turn lever 40. As a result, as shown in FIG. 3, the bracket 30 reaches a left turn indication position L.

By the pivoting of the bracket 30 to the left turn indication position L, the bottom part of the ratchet shaft 21 of the ratchet 20 is distanced from the tip of the guide convexed section 36 and moves along an inclining surface of the guide convexed section 36 toward the foot of the mountain shape thereof. The bottom part of the ratchet shaft 21 is also displaced in the direction of arrow D by the urging force of the ratchet spring 22. The cancel cam-side end 24 of the ratchet 20 contacts an outer cam wall 12a1 of the cam section 12 of the cancel cam structure 10 at a strong force by the urging force of the ratchet spring 22. This contact generates hammering noise.

At this point, the non-cancel cam-side end 25 of the ratchet 20 is moved close to, or put into contact with, the engaging section 32. Along with the pivoting of the bracket 30 in the direction of arrow A1, a left turn switch of a turn signal switch (not shown) is turned on and thus a left turn signal lamp (not shown) blinks.

When the bracket 30 and the turn lever 40 are at this left turn indication position L, the cancel cam structure 10 may be pivoted leftward (direction of arrow F1; forward direction), which is the direction indicated by the turn lever 40, by the pivoting of the steering wheel. When this occurs, the cam section 12, pivoting in the direction of arrow F1, contacts the cancel cam-side end 24.

In this case, the ratchet 20 swings about the ratchet shaft 21 such that the non-cancel cam-side end 25, which is close to the engaging section 32, is distanced away therefrom (swings in a direction of arrow G1). Therefore, the cam section 12 is allowed to pivot in the direction of arrow F1. Thus, the bracket 30 and the turn lever 40 are kept at the left turn indication position L.

When the bracket 30 and the turn lever 40 are at the left turn indication position L as shown in FIG. 3, the cancel cam structure 10 may be pivoted rightward (direction of arrow F2), which is opposite to the direction indicated by the turn lever 40, by the pivoting of the steering wheel. When this occurs, the cam section 12, pivoting in the direction of arrow F2, contacts the cancel cam-side end 24.

In this case, the ratchet 20 swings and pivots about the ratchet shaft 21 such that the non-cancel cam-side end 25, which is close to the engaging section 32, is engaged therewith (swings in a direction of arrow G2).

Along with the pivoting of the ratchet 20 in the direction of arrow G2, the non-cancel cam-side end 25 is engaged with the engaging section 32, and thus a pivoting force of pivoting the bracket 30 in the direction of arrow A2 is generated. Owing to this, the bracket 30 and the turn lever 40 are pivoted in the direction of arrow A2 back to the neutral portion N shown in FIG. 2. In this manner, the cancel mechanism 1 makes a self-cancel operation. Along with this, the left turn switch of the turn signal switch is turned off and thus the left turn signal lamp is put out.

In the above description regarding the operation of the cancel mechanism 1, the turn lever 40 is pivoted to the left turn indication position L. In the case where the turn lever 40 is pivoted to the right turn indication position R, the basic operation is substantially the same except that the pivoting direction of each member is opposite. Thus, the description thereof will be omitted.

The above-described cancel cam structure 10 provides the following functions and effects.

The cam section 12 of the cancel cam structure 10 includes the partition walls 14 for dividing the enclosed space S enclosed by the outer wall 13. Owing to this, the rigidity of the cam section 12 is increased, and thus the range and amplitude of vibration of the cam section 12 caused by the contact of the cancel cam-side end 24 of the ratchet 20 to the cam section 12 of the cancel cam structure 10 can be reduced. Therefore, the noise of contact (hammering noise) of the cancel cam structure 10 and the ratchet 20 can be suppressed to be small, which improves the comfort of the driver.

The cam section 12 has a shape uniform with respect to the central axis. Therefore, the cam section 12 providing the above-described effect can be formed easily by plastic molding.

The partition walls 14 are provided to extend straight in the radial direction. Owing to this, the rigidity of the cam section 12 is increased especially in the radial direction. Therefore, the vibration of the cam section 12 can be suppressed to be significantly small when the cancel cam-side end 24 of the ratchet 20 approaches the outer circumferential cam wall 13a of the cam section 12 of the cancel cam structure 10 in a direction from a radially outer side toward a radially inner side and contacts the outer circumferential cam wall 13a. Thus, the contact noise (hammering noise) generated when the ratchet 20 moves toward the central axis of the cam section 12 and contacts the cam section 12 can be suppressed to be significantly small.

Since the cam section 12 is divided by the partition walls 14, the outer circumferential cam wall 13a and the inner wall 13b facing the outer circumferential cam wall 13a are each divided by the partition walls 14 in the circumferential direction. Each divided part of the outer circumferential cam wall 13a and a corresponding divided part of the inner wall 13b have different lengths from each other in the circumferential direction. Therefore, resonance of the inner wall 13b due to vibration of the outer circumferential cam wall 13a does not occur easily. Thus, the contact noise (hammering noise) generated when the ratchet 20 contacts the cam section 12 can be suppressed to be small.

The cam section 12 includes a plurality of partition walls 14 for dividing the enclosed space S. Owing to this, as compared with the case where the cancel cam structure includes one partition wall, the rigidity of the cam section 12 of the cancel cam structure 10 is higher, and thus the vibration noise of the cam section 12 generated when the cancel cam-side end 24 of the ratchet 20 contacts the cam section 12 of the cancel cam structure 10 can be suppressed to be smaller.

As described above, the cancel cam structure 10 can suppress the vibration, caused by the contact of the cancel cam-side end 24 of the ratchet 20 to the cam section 12 of the cancel cam structure 10, to be small. Therefore, the rotatable connector device 2 can suppress the vibration applied on the rotatable connector 70 itself to be small.

The above-described functions and effects are effectively exerted on the contact noise generated when the turn lever 40 is pivoted to the left turn indication position (or right turn indication position) to put the ratchet 20 into contact with the cam section 12, and also on contact noise generated by any contact between the ratchet 20 and the cam section 12 caused until the self-cancel operation of the cancel mechanism 1 is completed.

Figure 6:
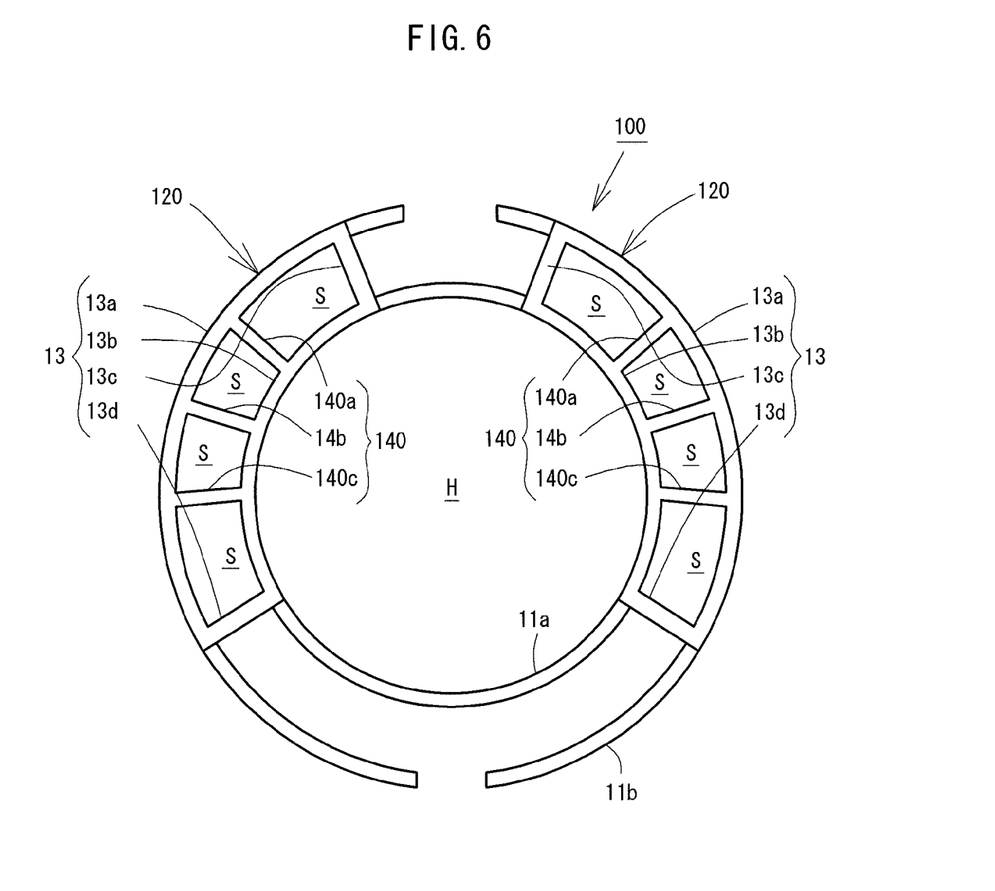
FIG. 6 is a plan view of a cancel cam structure in another embodiment.

The present invention is not limited to the above embodiment and can be implemented in many other embodiments. For example, as shown in FIG. 6, the distance between the coupling cam wall 13c and a first partition wall 140a and the distance between a third partition wall 140c and the coupling cam wall 13d may be longer than the distance between the first partition wall 140a and the second partition wall 14b and the distance between the second partition wall 14b and a third partition wall 140c.

In this case, inner spaces divided by partition walls 140 include two or more types of spaces having different shapes. Therefore, the natural frequency of a cam section 120 of a cancel cam structure 100 can be dispersed into two or more. This can suppress the resonance of the cam section 120 of the cancel cam structure 100.

In the above-described embodiment, for example, the cancel cam structure 10 is provided in the rotatable connector 70. Alternatively, the cancel cam structure 10 may be provided separately from the rotatable connector 70.

The cancel cam structure 10 in the above-described embodiment is usable for any other cancel mechanism in which a ratchet and the cam section 12 or 120 are put into contact with each other, as well as for the cancel mechanism 1.

REFERENCE SIGNS LIST

2 . . . Rotatable connector device
10, 100 . . . Cancel cam structure
12, 120 . . . Cam section
13a . . . Outer circumferential cam wall
13b . . . Inner wall
13c, 13d . . . Coupling cam wall
14, 140 . . . Partition wall
14a, 140a . . . First partition wall
14b . . . Second partition wall
14c, 140c . . . Third partition wall
20 . . . Ratchet
70 . . . Rotatable connector
71 . . . Fixed case
71a . . . Fixed-side ring plate
71b . . . Outer cylindrical section
72 . . . Rotatable case
72b . . . Inner cylindrical section
S . . . Enclosed space
X . . . Axial direction

The invention claimed is:

1. A cancel cam structure which includes a cam section for allowing a ratchet to be put into contact therewith, is located radially outer to an axial direction of a steering shaft, and is pivotable along with pivoting of a steering wheel connected to the steering shaft; wherein:
the cam section includes:
an outer circumferential cam wall for allowing the ratchet to slide thereon;
an inner wall located radially inner to the outer circumferential cam wall; and
a coupling cam wall for coupling ends of the outer circumferential cam wall and the inner wall;
the outer circumferential cam wall, the inner wall, and the coupling cam wall are formed parallel to the axial direction; and an enclosed space is formed by the outer circumferential cam wall, the inner wall, and the coupling cam wall;
at least one of the outer circumferential cam wall, the inner wall, and the coupling cam wall has a projection section projecting toward the enclosed space;
the outer circumferential cam wall has an arc shape such that any cross-section thereof perpendicular to the axial direction is centered around an intersection of a central axis of the steering shaft and the cross-section, the arc shape having a certain diameter, and the outer circumferential cam wall extends uniformly in the axial direction;
the inner wall has an arc shape such that any cross-section thereof perpendicular to the axial direction is centered around an intersection of the central axis and the cross-section, the arc shape having a certain diameter smaller than the diameter of the outer circumferential cam wall, and the inner wall extends uniformly in the axial direction;
the projection section is formed of a plurality of flat plate-like partition walls standing upright in the axial direction and being arranged at prescribed intervals, the partition walls dividing the enclosed space; and
distances between the coupling cam wall and the partition wall adjacent thereto and between the partition walls adjacent thereto include at least two different distance values.

2. The cancel cam structure according to claim 1, wherein the partition wall extends straight in a radial direction.

3. A rotatable connector device, comprising:
a rotatable connector; and
a cancel cam structure according to claim 2;
wherein the rotatable connector includes:
a fixed case including a ring-shaped fixed-side ring plate and an outer cylindrical section having a cylindrical shape and extending perpendicularly from an outer circumferential edge of the fixed-side ring plate; and
a rotatable case including a ring-shaped rotatable-side ring plate and an inner cylindrical section having a cylindrical shape and extending perpendicularly from an inner circumferential edge of the rotatable-side ring plate toward the fixed case;
wherein:
the fixed case and the rotatable case are fit to each other so as to be rotatable with respect to each other in a clockwise direction and a counterclockwise direction; and
an accommodation section is formed by the fixed-side ring plate and the outer cylindrical section of the fixed case and the rotatable-side ring plate and the inner cylindrical section of the rotatable case.

4. A rotatable connector device, comprising:
a rotatable connector; and
a cancel cam structure according to claim 2;
wherein the rotatable connector includes:
a fixed case including a ring-shaped fixed-side ring plate and an outer cylindrical section having a cylindrical shape and extending perpendicularly from an outer circumferential edge of the fixed-side ring plate; and
a rotatable case including a ring-shaped rotatable-side ring plate and an inner cylindrical section having a cylindrical shape and extending perpendicularly from an inner circumferential edge of the rotatable-side ring plate toward the fixed case;
wherein:
the fixed case and the rotatable case are fit to each other so as to be rotatable with respect to each other in a clockwise direction and a counterclockwise direction;
an accommodation section is formed by the fixed-side ring plate and the outer cylindrical section of the fixed case and the rotatable-side ring plate and the inner cylindrical section of the rotatable case; and
the cancel cam structure includes a plurality of the partition walls.

5. A rotatable connector device, comprising:
a rotatable connector; and
a cancel cam structure according to claim 2;
wherein the rotatable connector includes:
a fixed case including a ring-shaped fixed-side ring plate and an outer cylindrical section having a cylindrical shape and extending perpendicularly from an outer circumferential edge of the fixed-side ring plate; and
a rotatable case including a ring-shaped rotatable-side ring plate and an inner cylindrical section having a cylindrical shape and extending perpendicularly from an inner circumferential edge of the rotatable-side ring plate toward the fixed case;
wherein:
the fixed case and the rotatable case are fit to each other so as to be rotatable with respect to each other in a clockwise direction and a counterclockwise direction;
an accommodation section is formed by the fixed-side ring plate and the outer cylindrical section of the fixed case and the rotatable-side ring plate and the inner cylindrical section of the rotatable case; and
the cancel cam structure includes a plurality of the partition walls at prescribed intervals, and distances between the coupling cam wall and the partition wall adjacent thereto and between the partition walls adjacent thereto include at least two different distance values.

6. A rotatable connector device, comprising:
a rotatable connector; and
a cancel cam structure according to claim 1;
wherein the rotatable connector includes:
a fixed case including a ring-shaped fixed-side ring plate and an outer cylindrical section having a cylindrical shape and extending perpendicularly from an outer circumferential edge of the fixed-side ring plate; and
a rotatable case including a ring-shaped rotatable-side ring plate and an inner cylindrical section having a cylindrical shape and extending perpendicularly from an inner circumferential edge of the rotatable-side ring plate toward the fixed case;

wherein:
the fixed case and the rotatable case are fit to each other so as to be rotatable with respect to each other in a clockwise direction and a counterclockwise direction; and
an accommodation section is formed by the fixed-side ring plate and the outer cylindrical section of the fixed case and the rotatable-side ring plate and the inner cylindrical section of the rotatable case.

7. A rotatable connector device, comprising:
a rotatable connector; and
a cancel cam structure according to claim 1;
wherein the rotatable connector includes:
  a fixed case including a ring-shaped fixed-side ring plate and an outer cylindrical section having a cylindrical shape and extending perpendicularly from an outer circumferential edge of the fixed-side ring plate; and
  a rotatable case including a ring-shaped rotatable-side ring plate and an inner cylindrical section having a cylindrical shape and extending perpendicularly from an inner circumferential edge of the rotatable-side ring plate toward the fixed case;

wherein:
the fixed case and the rotatable case are fit to each other so as to be rotatable with respect to each other in a clockwise direction and a counterclockwise direction;
an accommodation section is formed by the fixed-side ring plate and the outer cylindrical section of the fixed case and the rotatable-side ring plate and the inner cylindrical section of the rotatable case; and
the cancel cam structure includes a plurality of the partition walls.

8. A rotatable connector device, comprising:
a rotatable connector; and
a cancel cam structure according to claim 1;
wherein the rotatable connector includes:
  a fixed case including a ring-shaped fixed-side ring plate and an outer cylindrical section having a cylindrical shape and extending perpendicularly from an outer circumferential edge of the fixed-side ring plate; and
  a rotatable case including a ring-shaped rotatable-side ring plate and an inner cylindrical section having a cylindrical shape and extending perpendicularly from an inner circumferential edge of the rotatable-side ring plate toward the fixed case;

wherein:
the fixed case and the rotatable case are fit to each other so as to be rotatable with respect to each other in a clockwise direction and a counterclockwise direction;
an accommodation section is formed by the fixed-side ring plate and the outer cylindrical section of the fixed case and the rotatable-side ring plate and the inner cylindrical section of the rotatable case; and
the cancel cam structure includes a plurality of the partition walls at prescribed intervals, and distances between the coupling cam wall and the partition wall adjacent thereto and between the partition walls adjacent thereto include at least two different distance values.

* * * * *